United States Patent
Schäfer et al.

(10) Patent No.: US 11,207,799 B2
(45) Date of Patent: Dec. 28, 2021

(54) PELLETIZATION GAS GUIDE

(71) Applicant: Wisconsin Alumni Research Foundation, Madison, WI (US)

(72) Inventors: Christian Schäfer, Madison, WI (US); Tim Andreas Osswald, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1111 days.

(21) Appl. No.: 15/633,227

(22) Filed: Jun. 26, 2017

(65) Prior Publication Data

US 2018/0371346 A1 Dec. 27, 2018

(51) Int. Cl.
| | |
|---|---|
| *B29B 9/10* | (2006.01) |
| *C10L 5/06* | (2006.01) |
| *B01J 2/16* | (2006.01) |
| *B01J 19/26* | (2006.01) |
| *F26B 3/092* | (2006.01) |
| *B30B 7/00* | (2006.01) |
| *C10L 5/00* | (2006.01) |

(Continued)

(52) U.S. Cl.
CPC .................. *B29B 9/10* (2013.01); *B01J 2/16* (2013.01); *B01J 19/26* (2013.01); *C10L 5/06* (2013.01); *F26B 3/092* (2013.01); *B29B 9/06* (2013.01); *B29B 2009/125* (2013.01); *B30B 7/00* (2013.01); *C10L 5/00* (2013.01)

(58) Field of Classification Search
CPC ....................................................... B29B 9/10
See application file for complete search history.

(56) References Cited

U.S. PATENT DOCUMENTS 3,937,772 A * 2/1976 Urban ..................... B29C 48/00
   264/12
4,619,597 A * 10/1986 Miller ..................... B05B 7/066
   425/7

(Continued)

FOREIGN PATENT DOCUMENTS

| KR | 101391875 B1 | 5/2014 | |
| KR | 1671145 B1 | 10/2016 | |
| WO | WO-2005058507 A1 * | 6/2005 | ............... B29B 9/10 |

OTHER PUBLICATIONS

International Search Report and Written Opinion for corresponding International Patent Application No. PCT/US2018/039342 dated Jan. 2, 2019.

(Continued)

*Primary Examiner* — Timothy Kennedy
(74) *Attorney, Agent, or Firm* — Crawford Maunu PLLC (57) ABSTRACT

Polymer pellets are formed using laminar gas flow within a downstream gas conduit, as may be implemented consistent with one or more embodiments herein. A gas channel directs gas to an outlet of a polymer extrusion mandrel via which a polymer melt is extruded. A downstream gas conduit extends away from the outlet of the polymer extrusion mandrel, and provides laminar gas flow along the polymer melt extending from the extrusion mandrel, and within the downstream gas conduit. Using this approach, laminar flow can be maintained along an initial portion of the polymer melt, and used to control the subsequent formation of pellets therefrom.

20 Claims, 8 Drawing Sheets

(51) Int. Cl.
*B29B 9/12* (2006.01)
*B29B 9/06* (2006.01)

(56) References Cited

U.S. PATENT DOCUMENTS

| | | | | |
|---|---|---|---|---|
| 5,020,723 | A * | 6/1991 | Crist | B05B 7/066 239/11 |
| 5,260,003 | A * | 11/1993 | Nyssen | D01D 4/025 264/6 |
| 5,280,884 | A * | 1/1994 | Dorri | B22F 9/082 264/12 |
| 5,366,204 | A * | 11/1994 | Gigliotti, Jr. | B22F 9/082 222/593 |
| 6,093,750 | A | 7/2000 | Craig et al. | |
| 2012/0126466 | A1 * | 5/2012 | Tajiri | B29C 48/272 264/555 |
| 2013/0234350 | A1 | 9/2013 | Osswald | |
| 2015/0119484 | A1 * | 4/2015 | Osaka | B29B 9/10 521/157 |
| 2016/0089815 | A1 | 3/2016 | Osswald et al. | |
| 2016/0303802 | A1 * | 10/2016 | Meshorer | B29C 48/18 |

OTHER PUBLICATIONS

Aquite et al. "Notes on the Micropelletization of Polyer Resins." ANTEC Conference Proceedings 2, 70th Annual Tech. Conference, p. 1136-1140 (2012). ISBN 9781622760831.

Puente, "Manufacturing of Micropellets Using Rayleigh Disturbances: Building the Optimized Micropelletizer Die," Master Thesis, Universidad Nacional de Colombia Sede Bogota, 82 pgs (Dec. 2011).

Schafer, "Polymer Micropellet and Powder Production Using a Novel Extrusion Process," Dissertation, UW-Madison, 174 pgs (2017).

* cited by examiner

PELLETIZATION GAS GUIDE

FIELD

Aspects of the present disclosure relate generally to pelletizing, and more specifically, to generating polymer pellets using a gas conduit.

BACKGROUND

Polymer-based pellets are useful in a multitude of applications. In particular, powders and micropellets (e.g., with cross-sections of less than 2 mm, 50 microns or smaller) have been in increasing demand in the field of polymer processing. For example, polymer micropellets, or powders, of controlled size, geometry, size distribution and morphology can be used for the manufacture and performance of parts using micro-injection molding processes, sintering processes, and others.

While various micropellets have seen increasing demand, controlling the properties of pellets in terms of their size and shape at desirable costs has been challenging. Previous approaches have been costly to implement and resulting products have been insufficient to meet certain needs. These and other problems have been challenging to the manufacture and implementation of a variety of types of micropellets.

SUMMARY

Various aspects of the present disclosure are directed to forming polymer-based pellets.

In accordance with one or more embodiments, an apparatus and/or method involves a gas channel that directs gas to an outlet of a polymer extrusion mandrel, and a downstream gas conduit extending away from the outlet of the polymer extrusion mandrel. The downstream gas conduit provides laminar gas flow along a polymer melt extending from the extrusion nozzle and within the downstream gas conduit. In various implementations, the downstream gas conduit has a sidewall extending in parallel with a direction via which a polymer melt is extruded from the polymer extrusion mandrel. The sidewall directs the laminar flow of gas from the gas channel in a direction that is parallel to the flow of the polymer melt extending from the extrusion nozzle.

In accordance with another embodiment, an apparatus includes a polymer extruder that extrudes polymer material through an extrusion nozzle, and a gas nozzle coupled to the polymer extruder. The gas nozzle has a gas channel, a downstream gas conduit, and a gas outlet offset from the extrusion nozzle. The downstream gas conduit extends away from an outlet of the extrusion nozzle to a gas outlet, with the gas nozzle providing laminar gas flow within the downstream gas conduit along a polymer melt extending from the extrusion nozzle.

One or more method-based embodiments are directed as follows. A gas nozzle having a gas channel, a downstream gas conduit and a gas outlet is coupled to an extrusion nozzle, with the gas outlet offset from the extrusion nozzle and the downstream gas conduit extending away from an outlet of the extrusion nozzle to a gas outlet. A polymer melt is extruded through the extrusion nozzle while using the gas channel and downstream gas conduit to provide laminar gas flow within the downstream gas conduit and along the polymer melt extending from the extrusion nozzle.

The above summary is not intended to describe each embodiment or every implementation of the present disclosure. The figures and detailed description that follow more particularly exemplify various embodiments.

DESCRIPTION OF THE FIGURES

Aspects of the disclosure may be more completely understood in consideration of the following detailed description of various embodiments in connection with the accompanying drawings, in which.

While various embodiments of the disclosure are amenable to modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION

Various aspects of the present disclosure are directed to methods and apparatuses involving the forming of polymer-based pellets, utilizing a downstream gas conduit. While the present disclosure is not necessarily limited as such, various aspects may be appreciated through a discussion of examples using this context.

In connection with various example embodiments, a nozzle-type component is configured for implementation with an extruder, to provide a downstream gas conduit for a polymer melt being extruded. The downstream gas conduit extends from the extruder, providing a region at which gas can be flowed along a portion of the polymer melt having been extruded. In connection with one or more aspects herein, it has been recognized/discovered that the dimensions of the gas conduit can be set/controlled to facilitate the application of the gas flow to the polymer melt to suit particular applications, such as to set a laminar flow and pressure that facilitate the formation of pellets of a particular morphology. Accordingly, by varying the downstream gas conduit dimensions, particle size and shape can be controlled.

In connection with one or more embodiments, it has been further discovered that, by utilizing a downstream gas conduit that extends a sufficient distance from an extruder nozzle, laminar flow can be maintained along the polymer melt for such a distance and be used to generate a non-uniform thickness in the polymer melt. This non-uniform thickness leads to surface instabilities/waves on the extruded polymer melt, which can also be referred to as Rayleigh disturbances. As such, the onset of turbulent flow/open jet conditions can be delayed relative to the point at which the polymer melt leaves the extruder nozzle. Delaying the onset of turbulent flow/open jet, using the downstream gas conduit, can promote the development of the Rayleigh disturbances, which facilitate controlled breakup of the extruded polymer strand and pellet formation. The size of the nozzle can be used to tune the pressure applied to the polymer melt, and the length can also be used to set an amount of laminar flow along the polymer melt. The size and shape of the pellets can thus be controlled in this regard. For general information regarding polymer extrusion, and for specific information regarding manners in which Rayleigh disturbances can be formed and used, reference may be made to U.S. Patent Publication No. 2013/0234350 entitled "Method and Apparatus for Micropelletization," which is fully incorporated herein by reference.

In various contexts, a sufficient distance/length of a downstream gas conduit is a length that causes laminar flow to occur along the polymer melt in a manner that generates the aforementioned non-uniform thickness within the conduit, prior to the polymer melt being exposed to turbulent gas flow. An insufficient distance/length of the downstream gas conduit is a length at which the non-uniform thickness cannot be formed prior to exposure of the polymer melt to turbulent air as it exits the conduit.

In a more particular implementation, a micropelletization die having an extrusion nozzle has a zero setback configuration with an additional 3 mm long downstream gas conduit at the exit of the extrusion nozzle and extending through an outlet of a gas nozzle of the downstream gas conduit. The downstream air conduit guides the airstream parallel to an extruded polymer strand extending from the extrusion nozzle, promoting laminar airflow in the region where the polymer and air meet, and delaying open jet formation. This promotes pressure oscillations on the surface of the polymer strand, which are used to develop Rayleigh disturbances that cause a narrowing of the polymer strand at periodic locations. The use of a downstream gas conduit aids in controlling the micropelletizing process; by adjusting its length and size, pellet size and aspect ratio can be controlled. For example, particle size and aspect ratios can be decreased by increasing the length of the downstream gas conduit.

The location of the melt fracture and corresponding droplet size are controlled using a variety of approaches, to suit various embodiments. For example, one or more of gas conduit diameter, length, gas speed, gas temperature, polymer melt temperature (or related temperature of a die via which the polymer melt is extruded), and polymer melt extrusion rate can be controlled to set the size and shape of the pellets, and to control the location of the melt fracture. For instance, melt strength and viscosity can be used to determine the size of the particles after breakup, and molecular structure of the polymer material can be used to influence the occurrence of breakup. By increasing the viscosity of the melt, the diameter of the resulting pellets can be increased. The downstream gas conduit can be used to flow gas that applies a drag force to the polymer melt and induce deviatoric stresses and/or strain hardening therein, at a reduced-thickness portion at which melt fracture is eventually effected.

A variety of types of polymer-based materials are used to suit various embodiments. For example, various embodiments are directed to extruding polymer resin that includes a blend of different polymers. Furthermore, the type of polymer and its characteristics relative to extrusion such as brittleness and surface tension can be chosen to facilitate melt fracture as discussed herein. For general discussion of polymer pelletization, and for specific approaches and experimental-type aspects that may be used in accordance with one or more embodiments described herein, reference may be made to Aquite et al., "Notes on the Micropelletization of Polymer Resins," ANTEC (2012) and the references cited therein, which is fully incorporated herein by reference.

More specific embodiments are directed to methods and/or apparatuses for forming polymer pellets as follows. In accordance with another embodiment, an apparatus includes and/or is used with a polymer extruder that extrudes polymer material through an extrusion nozzle. The apparatus includes a gas nozzle that can be coupled to the polymer extruder and that includes a gas channel and a downstream gas conduit that extends away from the extrusion nozzle. The gas channel and downstream gas conduit provide laminar gas flow within the downstream gas conduit and along a polymer melt extending from the extrusion nozzle. In various implementations, the gas nozzle has a sidewall extending along the downstream gas conduit in parallel with a direction via which the polymer extruder extrudes the polymer material. The sidewall is used to direct gas from the gas channel in a direction that is parallel to the flow of the polymer melt extending from the extrusion nozzle. This laminar flow can thus be used to mitigate the onset of an open jet around the extruded polymer melt, facilitating Rayleigh disturbances (via drag force) and, therein, controlling the necking of the extruded polymer melt in a manner that facilitates the production of discrete pellets with controlled morphology and other characteristics.

In connection with this approach, it has been recognized/discovered that positioning the downstream gas conduit relative to the extrusion nozzle can achieve these aspects relative to laminar flow, delaying open jet characteristics, and pellet formation. Once the necked polymer melt exits the downstream gas conduit, turbulent flow can be utilized to separate pellets at necked portions thereof (e.g., via fracture). The length of the downstream gas conduit can thus be set to a sufficient value that maintains laminar flow (and, e.g., desired pressure/Rayleigh disturbance generation) along the polymer melt extending within the downstream gas conduit, and to cause periodic necking along the polymer melt within the downstream gas conduit.

One or more method-based embodiments may be implemented in accordance with the discussion above, utilizing components as described and/or other componentry. A gas nozzle having a gas channel and a downstream gas conduit is used to direct laminar gas flow within the downstream gas conduit and along polymer melt extruded therethrough. A sidewall of the downstream gas conduit may be used to direct the laminar flow of gas, which can be useful for mitigating the formation of an open jet via sufficient length and offset of the sidewall and, for example, applying Rayleigh disturbances to the polymer melt that cause periodic necking therein. Discrete droplets can be formed from the polymer melt by fracturing the polymer melt along necked portions thereof that have been extruded beyond the downstream gas conduit. By using the laminar flow, the extrusion rate may be carried out at a rate that is an order of magnitude less than a threshold rate at which the polymer melt would exhibit melt fracture caused by the extrusion.

Figure 1:
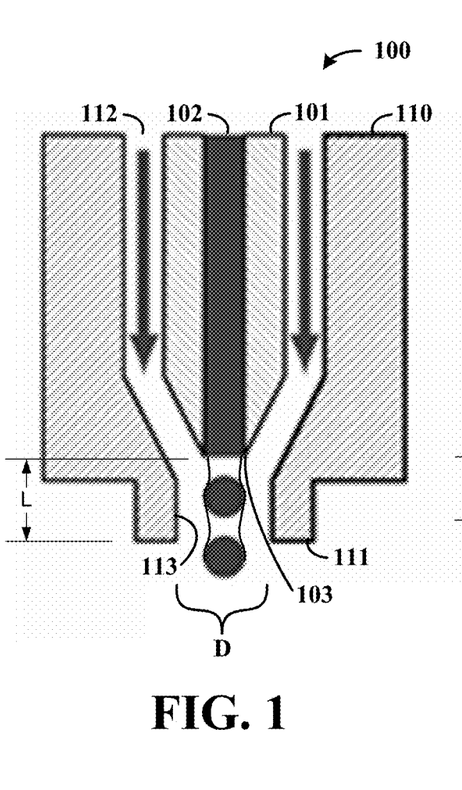
FIG. 1 shows a cross-sectional view of an apparatus including an extruder nozzle and a gas nozzle, in accordance with one or more embodiments.

Turning now to the figures, FIG. 1 is a cross-sectional view of an apparatus 100, including an extruder nozzle 101 and a gas nozzle 110, in accordance with an exemplary embodiment. The extruder nozzle 101 (e.g., mandrel) extrudes a polymer melt 102 through an opening at 103. The gas nozzle 110 extends around the extruder and provides gas flow along a channel 112 around the extruder nozzle. The gas nozzle 110 includes a downstream gas conduit 111 extending at a length "L" from the opening 103 to an outlet as shown, with a sidewall 113 of the conduit extending in a direction parallel with the extruded polymer melt. The extruder nozzle 101 is recessed within the gas nozzle 110, with the polymer melt exiting the extruder at a location offset from sidewall 113. The gas nozzle diameter "D" as shown can be set to tailor characteristics of pellets formed from the polymer melt. The downstream gas conduit 111 facilitates laminar flow along the polymer melt extending from the extruder nozzle 101, and therein causes periodic narrowing of the melt for the formation of pellets.

Figure 2:
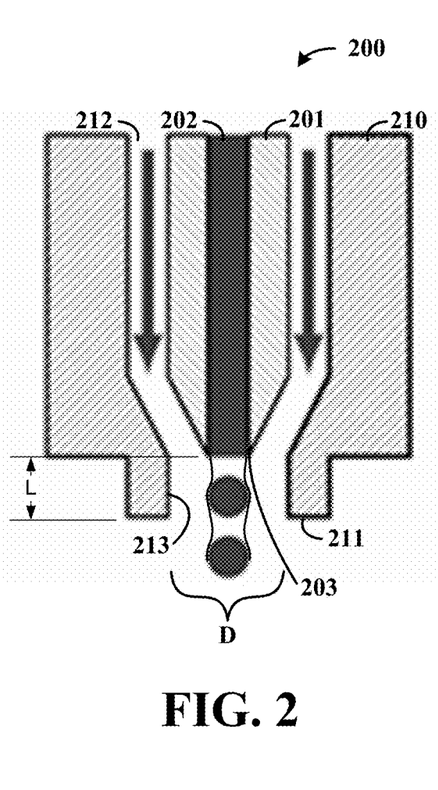
FIG. 2 shows a cross-sectional view of another apparatus including an extruder nozzle and a gas nozzle, in accordance with one or more embodiments.
Figure 3:
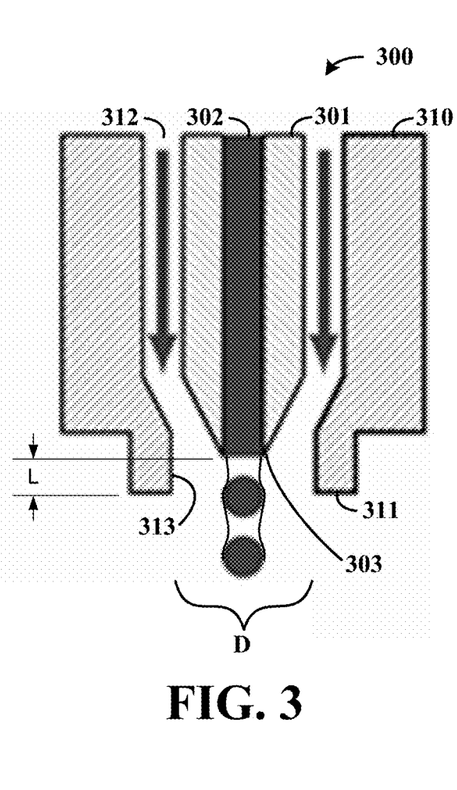
FIG. 3 shows a cross-sectional view of another apparatus including an extruder nozzle and a gas nozzle, in accordance with one or more embodiments.

FIGS. 2 and 3 show similar apparatuses, with different positions of the extruder nozzle relative to the gas nozzle, with similar components being similarly labeled, as may be implemented in accordance with respective embodiments. Accordingly, FIG. 2 shows a cross-sectional view of an apparatus 200 including extruder nozzle 201 and gas nozzle 210, with polymer melt 202 being extruded through an opening at 203. Gas flows along channel 212 and downstream gas conduit 211 extending at a length "L" from the opening 203. In this embodiment, the extruder nozzle opening 203 is aligned with no offset relative to the beginning of sidewall 213. The downstream gas conduit 211 facilitates laminar flow along the polymer melt extending from the extruder nozzle 201 and along the sidewall 213, causing periodic narrowing of the melt for the formation of pellets after the polymer melt exits the gas nozzle opening.

FIG. 3 shows a cross-sectional view of apparatus 300, including extruder nozzle 301 and gas nozzle 310, with an opening 303 extending into a downstream gas conduit at 311. Polymer melt 302 is extruded through an extruder nozzle opening at 303. Gas flows along channel 312 into the downstream gas conduit and along sidewall 313, at a length "L" from the opening 303. The downstream gas conduit 311 also facilitates laminar flow along the polymer melt extending from the extruder nozzle 301 and along the sidewall 313, causing periodic narrowing of the melt for the formation of pellets after the polymer melt exits the gas nozzle opening.

The downstream gas conduit used in FIGS. 1, 2 and 3 delays open jet formation in a region where the extruded polymer melt and atmosphere meet, and therein promotes pressure oscillations on the surface of the polymer melt (strand). These pressure oscillations develop Rayleigh disturbances. The influence of the downstream gas conduit on the production of micropellets can be adjusted by setting the offset at length "L" as shown, as well as setting the diameter "D" of the inner sidewall of the conduit (e.g., 113 of 111). These length and diameter parameters, as well as the gas characteristics (e.g., speed, type, temperature) can be controlled to provide aspects such as improved heat balance and independent control of melt and air temperature. To suit various implementations, adjustable or interchangeable mandrels can be used, with different capillary sizes. Further, adjustable or interchangeable attachments can be used for different setback configurations of the extruder nozzle relative to the downstream gas conduit (and exit therefrom), to set particle characteristics. In addition, an angle at which the gas meets the polymer melt can be controlled to facilitate desirable interaction therewith.

Extruder and gas nozzle components can be implemented in a variety of different types of extrusion processes, and with a variety of different types of extruders. For instance, various embodiments are directed to a gas nozzle apparatus that can be implemented with one or more extruder types, for achieving palletization control as characterized herein. Other embodiments are directed to extruder nozzles that can be coupled to one or more of a variety of different extruders, and including a gas nozzle with a downstream gas conduit as characterized herein.

Figure 4:
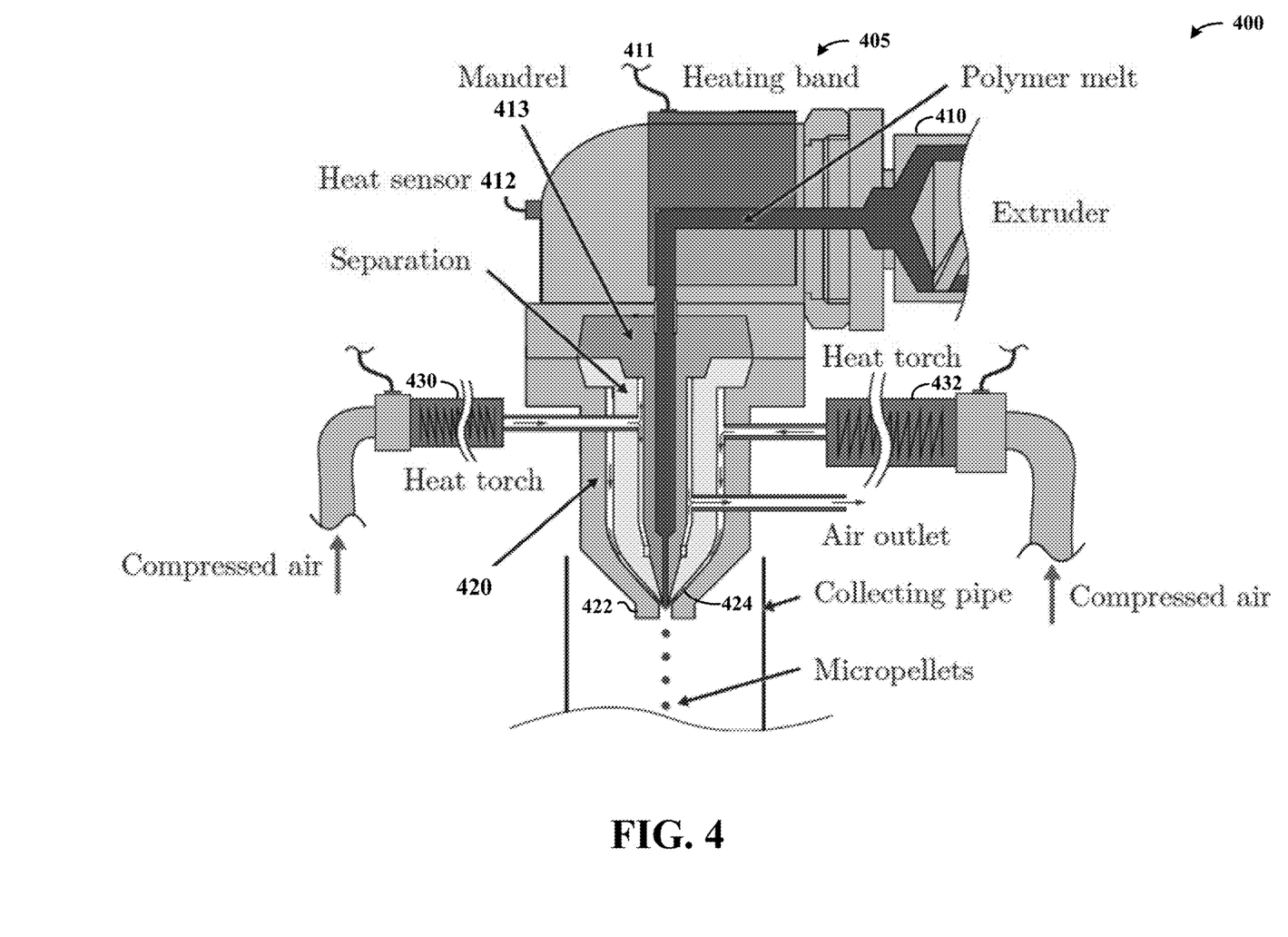
FIG. 4 shows a micropelletization apparatus, as may be implemented in accordance with one of more embodiments.

Accordingly, FIG. 4 shows a micropelletization apparatus 400, as may be implemented in accordance with one of more embodiments. The apparatus 400 includes an extruder 410 and a nozzle apparatus 405 having a heating band 411, heat sensor 412, mandrel 413 and gas nozzle 420. The gas nozzle 420 includes a downstream gas conduit 422, which can be implemented in a manner consistent with one or more embodiments characterized herein.

Heat torches 430 and 432 respectively heat compressed air provided along air channels respectively for heating the mandrel 413 and for providing air flow along the polymer melt as it is extruded from the mandrel 413. A separation piece or region provides independently controllable temperature zones. The airstream for heating the mandrel 413 is responsible for controlling the temperature of the mandrel and is therefore directly linked to the polymer melt temperature. It is heated by the heat torch 430 and flows between the mandrel and the separation piece/region, and leaves the nozzle through an air outlet as shown. The airstream provided through channel 424 and heated via heat torch 432 is responsible for causing surface disturbances on the extruded polymer strand, and is guided through a gap as shown. The channel 424 is smoothly curved to allow the airflow to meet the melt strand at the exit of the nozzle, while maintaining laminar flow. For general information regarding micropelletization dies and detailed calculations on flow and heat transfer behavior as may be implemented in accordance with one or more embodiments, reference may be made to J. Puentes: "Building an optimized micropelletizer die," Master Thesis, Universidad Nacional de Colombia Sede Bogota, 2011, which is fully incorporated herein by reference.

Various materials can be used for forming micropellets, with related downstream gas conduit dimensions and positioning relative to an extruder nozzle (or mandrel) to achieve production of pellets with desired morphology and/or other characteristics. The following discussion characterizes a variety of approaches, as may be implemented in connection with one or more embodiments.

Figure 5:
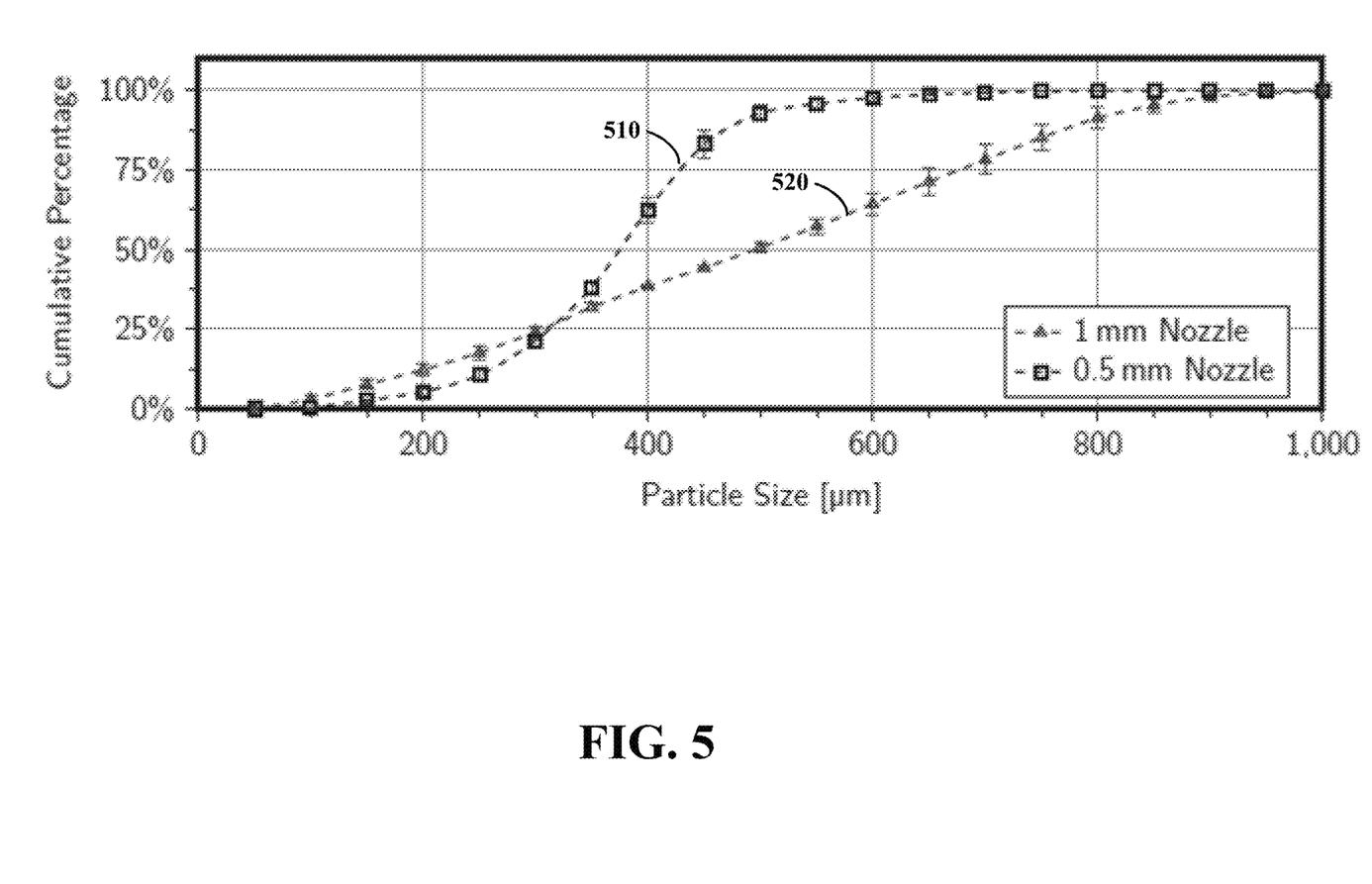
FIG. 5 shows plots of cumulative particle size distribution, as may be implemented in accordance with one of more embodiments.
Figure 6:
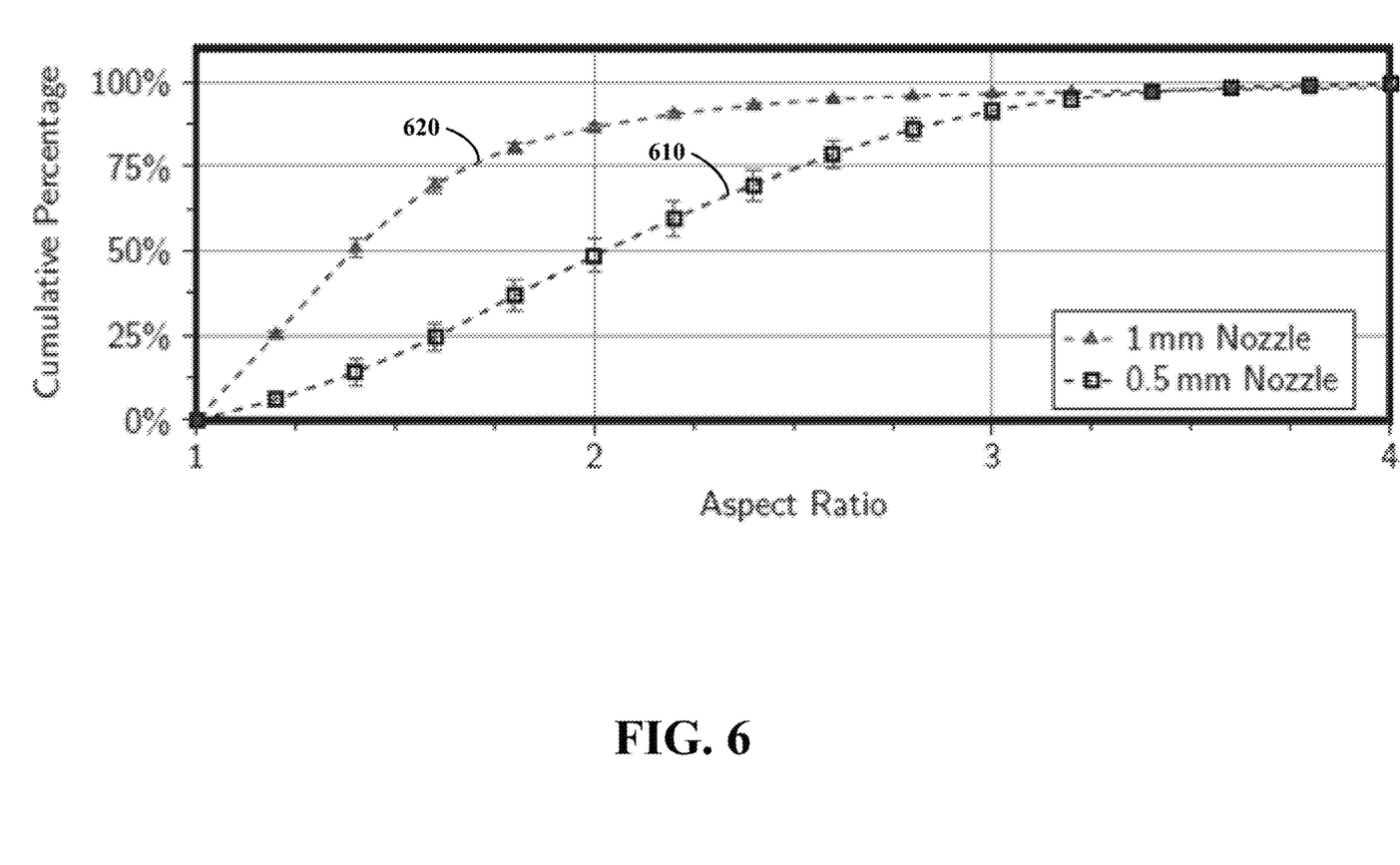
FIG. 6 shows plots of aspect ratio, as may be implemented in accordance with one of more embodiments.

FIG. 5 shows plots of cumulative particle size distribution, and FIG. 6 shows plots of aspect ratio, for micropellets respectively produced with a 0.5 mm capillary and a 1 mm capillary polymer extrusion mandrels. Specifically, plots 510 and 610 show particle size distribution and aspect ratio for the 0.5 mm capillary nozzle, and plots 520 and 620 show particle size distribution and aspect ratio for the 1 mm capillary nozzle.

Relative positioning, or setback, of the extruder nozzle and the downstream gas conduit can be tuned to set properties of the resulting pellets formed from the polymer melt. For instance, micropellets with spherical-type shapes can be formed using positive and zero setback configurations, a negative setback can be used to form elongated particle shapes. With a negative setback, the surrounding gas stream meets the extruded polymer strand after exiting the air gap. Therefore, the polymer strand meets the airstream at atmospheric pressure conditions and is no longer guided by the air gap. This, as well as the reduced airflow velocity when meeting the polymer strand, can reduce pressure oscillations on the surface of the extruded polymer strand, forming the elongated particle shapes. It has been recognized/discovered that particles produced with negative setback may exhibit similar shapes and breakup behavior as compared to those produced with a positive setback, at low airflow rates. As such, higher airflow rates can be used with negative setback to obtain complete breakup. It has further been recognized/discovered that zero and positive setbacks can be used to provide desirable particle size and particle size distribution, with positive setbacks used to provide relatively smaller particle size, aspect ratio and size distribution compared to that provided with a zero setback. Such approaches may, for example, be implemented with apparatuses as shown in FIG. 1 (positive setback) and FIG. 2 (zero setback).

Figure 7:
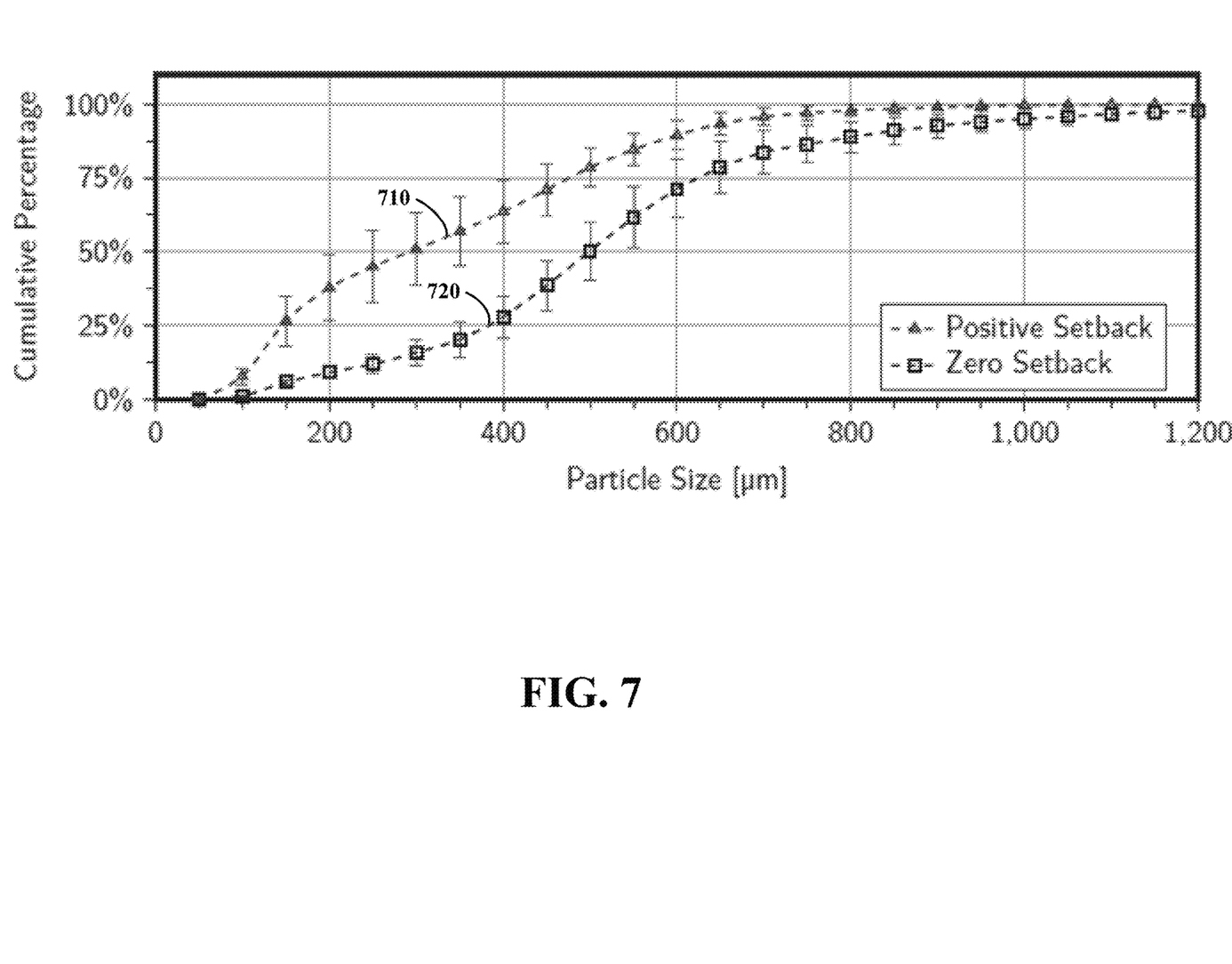
FIG. 7 shows plots of particle size, as may be implemented in accordance with one or more embodiments.
Figure 8:
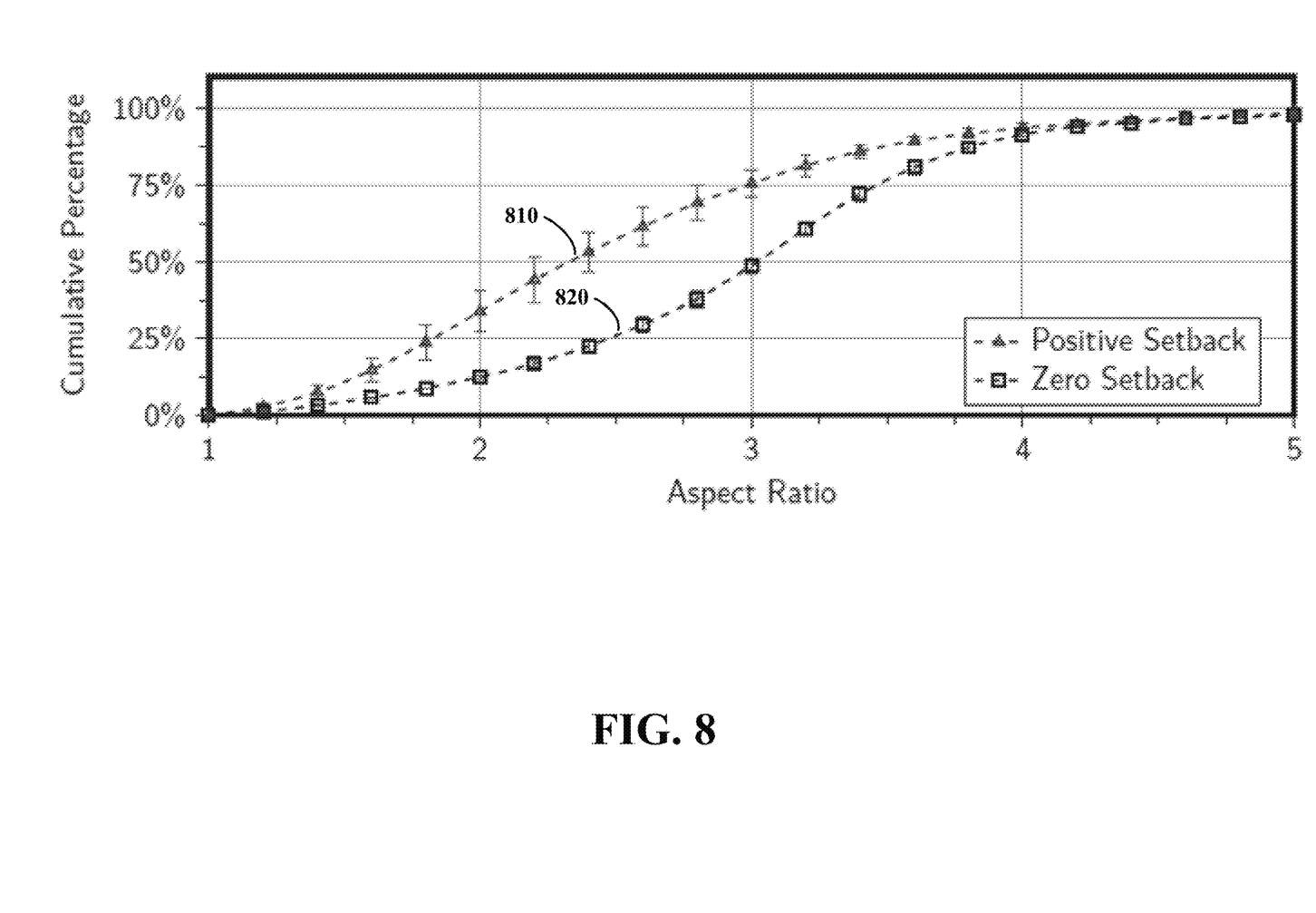
FIG. 8 shows plots of particle aspect ratio, as may be implemented in accordance with one or more embodiments.

FIGS. 7 and 8 respectively show plots of particle size and aspect ratio, as may be implemented in accordance with one or more embodiments. Consistent with the recognition/discovery noted herein, plots 710 and 810 show particle size and aspect ratios for a positive setback, and plots 720 and 820 show particle size and aspect ratios for zero setback.

Figure 9:
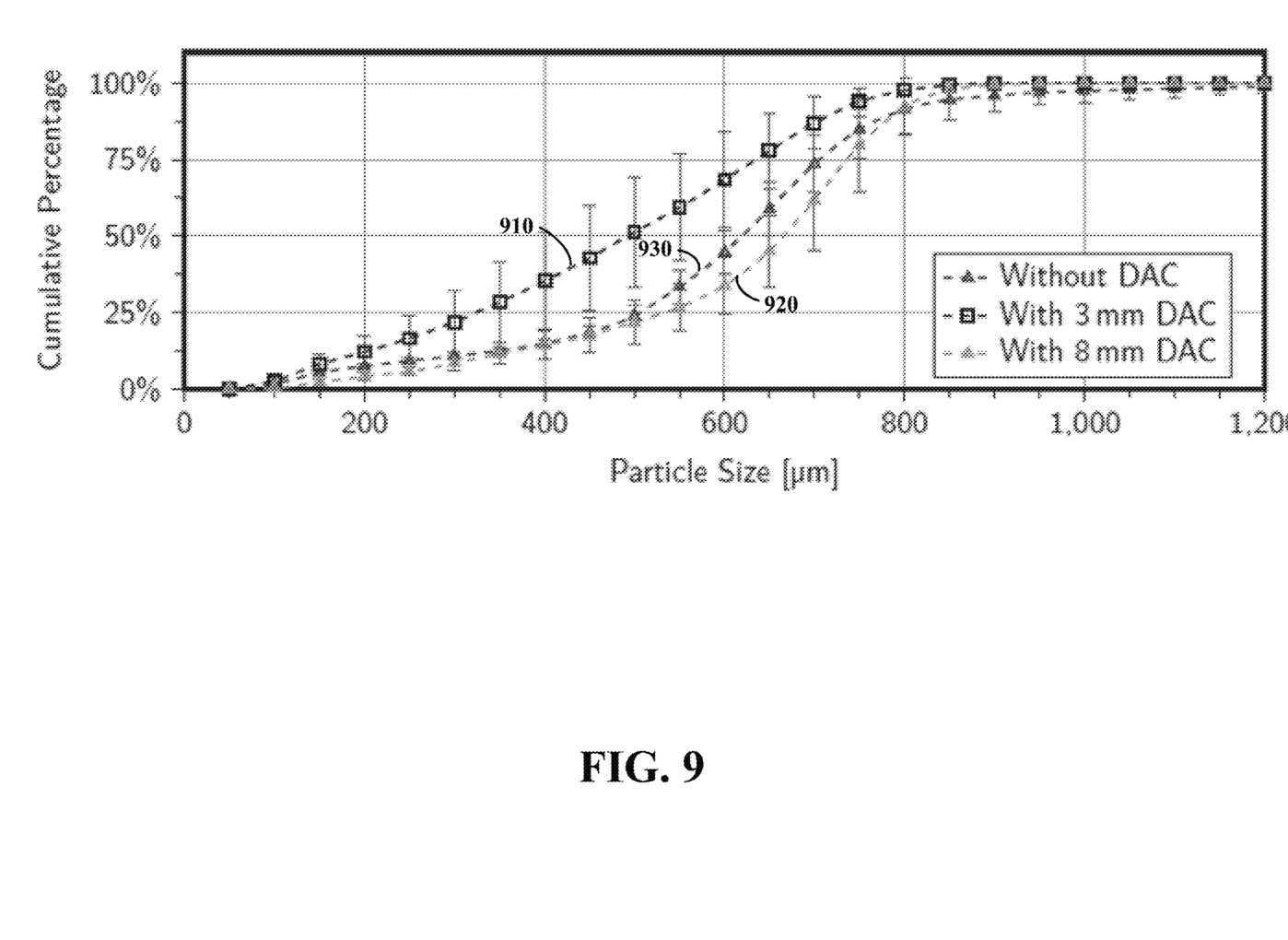
FIG. 9 shows cumulative particle size distribution for three different downstream gas conduit configurations and lengths.
Figure 10:
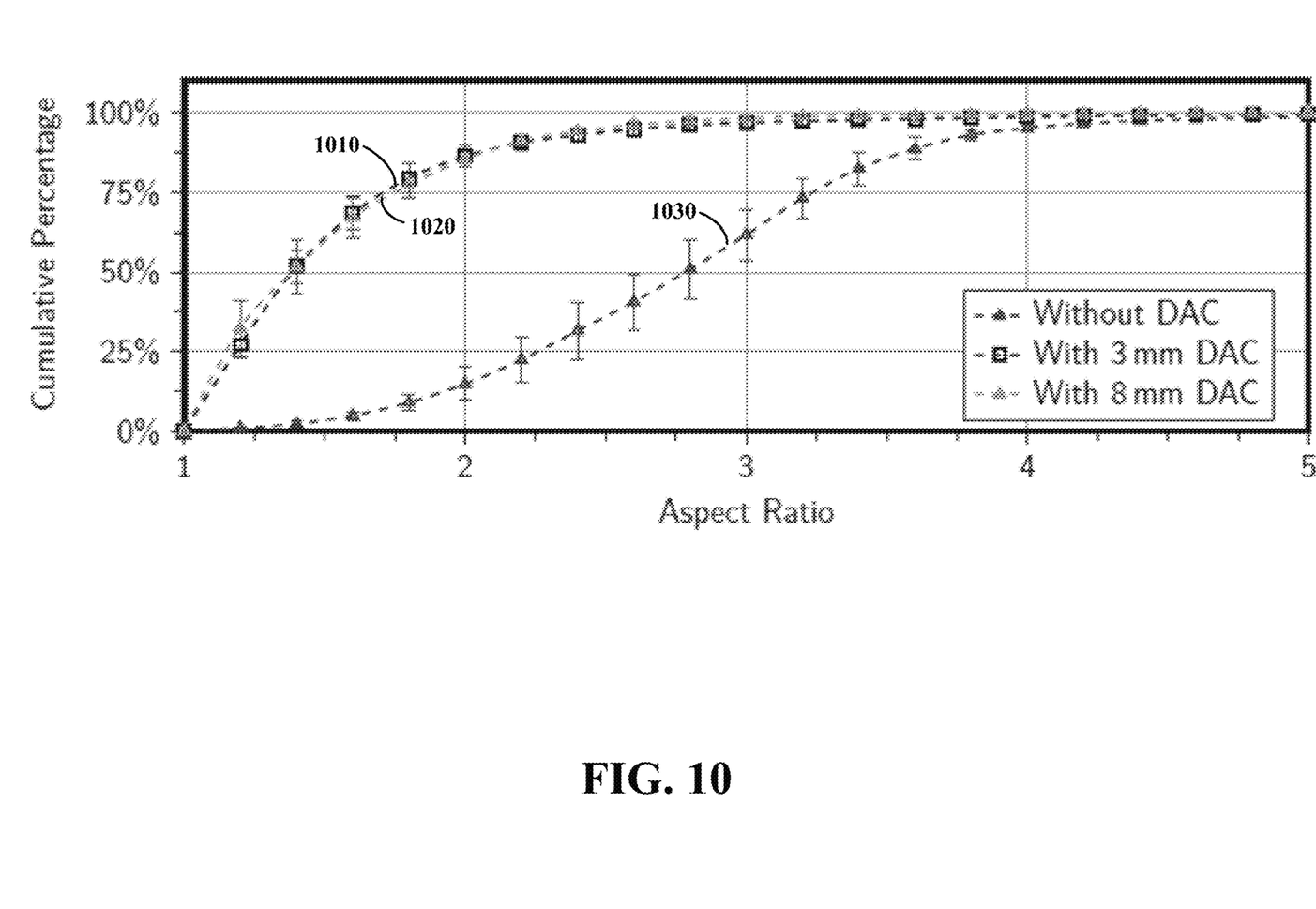
FIG. 10 shows cumulative aspect ratios for three different downstream gas conduit configurations and lengths.

FIGS. 9 and 10 show the cumulative particle size distribution and aspect ratio for three different downstream gas conduit configurations and lengths (e.g., length "L" in FIG. 2), as may be implemented in connection with one or more embodiments. Beginning with FIG. 9, plot 910 shows particle size distribution for a 3 mm downstream air conduit, plot 920 shows particle size distribution with an 8 mm downstream air conduit, and plot 930 shows particle size distribution with no downstream air conduit. In FIG. 10, plots 1010 and 1020 respectively show particle aspect ratio with 3 mm and 8 mm downstream air conduits, and plot 1030 shows particle aspect ratio with no downstream air conduit. As such, the use of the downstream air conduit has a major influence on the aspect ratio of produced micropellets, and less influence on particle size. Accordingly, it has been recognized/discovered that, by using the downstream air conduit, the aspect ratio shifts towards smaller values and produces more spherical particles. The downstream air conduit can thus be implemented to mitigate enhanced rotational movements and related centrifugal forces, which may result in snapping of the polymer strands instead of facilitating Rayleigh disturbances (as useful for providing uniform, controlled pelletization).

Breakup mechanisms are influenced by a variety of different parameters, such as process conditions and material properties. Aspects relating to the capillary diameter via which the polymer melt is extruded, length and offset of the downstream gas conduit, gas flow, temperature and outlet size can be set to tune particle properties. For instance, breakup of the polymer melt into particles can be effected via Rayleigh disturbances and controlled conditions that mitigate open jet and/or other flow that may otherwise fracture the polymer melt. For instance, a larger capillary (e.g., 1 mm vs. 0.5 mm) can be used to facilitate Rayleigh disturbances, and breakup of particles by stretching of the extruded strand before surface instabilities cause it to break up into particles. After breakup, polymer micropellets then solidify. Since micropellets tend to optimize their volume-to-surface area ratio, a further contraction of the produced micropellets occurs during cooling, supporting the formation of spherical particles.

Processing temperature can be utilized to set particle size. With higher processing temperatures, more uniform particle size distributions with smaller particles can be obtained, yet collection of the micropellets can become more challenging due to sticking of the pellets and occurrence of particle agglomerations. Various collection approaches can be implemented to facilitate the use of higher temperatures while maintaining collection yield. For instance, cooling air can be used to maintain cooler surfaces within collection components, which can mitigate sticking of the pellets. In addition, a large amount of air/gas can be drawn into collection components (e.g., tubes), relative to the amount of air/gas exiting the air nozzle as noted herein, to direct particles for collection, and which may also facilitate particle cooling. Further, various other particle cooling techniques may be used, such as by introducing the particles to liquid.

The extrusion rate can also be tailored to influence particle size and aspect ratio. Higher extrusion rates can provide larger shear rates and result in higher storage of energy per unit time, which may cause extrudate swell. Accordingly, larger particles can be produced at higher extrusion rates, and smaller particles produced at lower extrusion rates.

As noted above, the capillary diameter can be set to influence the production of micropellets. The aspect ratio of the produced micropellets is larger with a smaller (e.g., 0.5 mm) capillary, compared to particles produced with a larger (e.g., 1.0 mm) capillary. Particles produced with the smaller capillary can be provided with a higher molecular orientation due to a larger L/D ratio of the capillary. Additionally, larger L/D ratios give the polymeric fluid more time to release stored elastic energy, resulting in less die swell. Therefore, the polymer strand can solidify faster and break up more easily. During this process the surface tension of the particle decreases while the viscous forces increase (high Capillary number). This force balance inhibits contraction of the particles and leads to more elongated particle shapes. Therefore, particles produced with a 0.5 mm capillary may mainly show particle sizes in the range of the capillary diameter itself. Additionally, micropellets produced with a 0.5 mm capillary can be made with narrower particle size distributions. Such aspects may be achieved with a smaller capillary diameter that leads to higher shear forces (e.g., wall shear rates for a 0.5 mm capillary are six times larger compared to shear rates for a 1 mm capillary). Due to the shear-thinning behavior of the processed materials, higher shear rates may result in lower viscosities.

While various embodiments characterized herein involve the formation of micropellets, other shapes can be formed, such as by forming fibers and threads of different sizes and shapes. Various shapes can be obtained under a wide range of process conditions for different polymer resins. For instance, Profax™ 6523 polypropylene from LyondellBasell (Rotterdam, Netherlands), and Eastapak™ 9921 polyethylene terephthalate (PET) from Eastman (Kingsport, Tenn.), can be utilized to form filaments and pellets with elongated shapes.

Various embodiments described above and shown in the figures may be implemented together and/or in other manners. One or more of the items depicted in the drawings/figures herein can be implemented in a more separated or integrated manner, or removed and/or rendered as inoperable in certain cases, as is useful in accordance with particular applications. For example, certain embodiments are directed to a nozzle that can be implemented with one or more extruders. Other embodiments are directed toward setting a downstream gas conduit size, using one or more different nozzle/extruder combinations. In view of this and the description herein, those skilled in the art will recognize that many changes may be made thereto without departing from the spirit and scope of the present disclosure.

What is claimed is:

1. An apparatus comprising:
a polymer extruder configured and arranged to extrude polymer material through an extrusion nozzle; and
a gas nozzle coupled to the polymer extruder and having a gas channel, a downstream gas conduit and a gas outlet, the gas outlet being offset from the extrusion nozzle, the downstream gas conduit having a cylindrical inner sidewall extending away from an outlet of the extrusion nozzle to the gas outlet, the downstream gas conduit and extrusion nozzle being adjustable relative to one another for setting a length of a portion of the cylindrical inner sidewall that extends away from the extrusion nozzle,
wherein the gas nozzle is configured and arranged with the polymer extruder to provide laminar gas flow within the downstream gas conduit along a polymer melt extending from the extrusion nozzle.

2. The apparatus of claim 1, wherein the cylindrical inner sidewall extends along the downstream gas conduit in parallel with a direction via which the polymer extruder extrudes the polymer material, and is responsive to gas presented by the gas channel to direct the gas from the gas channel in a direction that is parallel to the flow of the polymer melt extending from the extrusion nozzle.

3. The apparatus of claim 2, wherein the gas nozzle is configured and arranged with the polymer extruder and with a length of the cylindrical inner sidewall to cause a non-uniform thickness along the polymer melt extending away from the extrusion nozzle and within the downstream gas conduit, by using the laminar flow within the downstream gas conduit to apply a drag force to the polymer melt.

4. The apparatus of claim 3, wherein the downstream gas conduit extends from the outlet of the extrusion nozzle to the gas outlet and is configured and arranged to mitigate the formation of an open jet along the polymer melt within the downstream gas conduit and before the polymer melt exits the gas outlet.

5. The apparatus of claim 4, wherein the gas nozzle is configured and arranged with the polymer extruder to fracture the polymer melt along a portion of the non-uniform thickness that is thinner than another portion of the polymer melt, by facilitating turbulent gas flow along a portion of the polymer melt extending out of the downstream gas conduit and away from the gas outlet.

6. The apparatus of claim 1, wherein the downstream gas conduit is configured and arranged with a length extending from the outlet of the extrusion nozzle that is sufficient to maintain laminar flow along the polymer melt extending within the downstream gas conduit and to cause periodic necking along the polymer melt within the downstream gas conduit.

7. The apparatus of claim 1, wherein the gas nozzle is configured and arranged with the polymer extruder to form discrete droplets from the polymer melt, by:
necking the polymer melt within the downstream gas conduit by using the laminar flow along the polymer melt to apply drag force to the polymer melt, and
fracturing the polymer melt along necked portions thereof that have been extruded beyond the gas nozzle outlet.

8. The apparatus of claim 7, wherein the downstream gas conduit is configured and arranged with a length, extending from the outlet of the extrusion nozzle to the gas outlet, that is sufficient to cause periodic necking along the polymer melt within the downstream gas conduit by introducing Rayleigh disturbances along the polymer melt extending within the downstream gas conduit.

9. The apparatus of claim 7, wherein fracturing the polymer melt includes fracturing the polymer melt to form the discrete droplet having a volume that is at least half of the volume of the polymer melt that extends from the nozzle when the polymer melt is fractured.

10. The apparatus of claim 1, wherein the downstream gas conduit extends in a direction that is parallel with a direction via which the polymer melt is extruded, and has a diameter relative to the polymer melt and to gas flow provided via the gas channel to apply pressure to the polymer melt that is sufficient to generate Rayleigh disturbances in the polymer melt.

11. The apparatus of claim 1, wherein the cylindrical inner sidewall and the extrusion nozzle have fixed diameters, and wherein an orifice defined by the cylindrical inner sidewall and an exterior of the extrusion nozzle is constant for a range of adjustment of the length of the portion of the cylindrical inner sidewall that extends away from the extrusion nozzle, with the cylindrical inner sidewall extending in parallel with a direction via which polymer melt is extruded, the length of the portion of the cylindrical inner sidewall being sufficient to direct a laminar flow of gas from the gas channel in a direction that is parallel to the flow of the polymer.

12. A method comprising:
providing a polymer extruder having an extrusion nozzle to extrude polymer material through an extrusion nozzle; and
coupling a gas nozzle having a gas channel, a downstream gas conduit and a gas outlet to the extrusion nozzle, the gas outlet being offset from the extrusion nozzle, the downstream gas conduit having a cylindrical inner sidewall extending away from an outlet of the extrusion nozzle to the gas outlet;
setting a length of a portion of the cylindrical inner sidewall that extends away from the extrusion nozzle by adjusting the downstream gas conduit and extrusion nozzle relative to one another; and
using the gas nozzle, including the channel and downstream gas conduit, with the polymer extruder to provide laminar gas flow within the downstream gas conduit and along polymer melt extending from the extrusion nozzle.

13. The method of claim 12, further including extruding the polymer material through the extrusion nozzle as a polymer melt, wherein the gas nozzle includes a sidewall extending along the downstream gas conduit in parallel with a direction via which the polymer extruder extrudes the polymer melt, further including using the sidewall to direct a laminar flow of gas from the gas channel in a direction that is parallel to the flow of the polymer melt extending from the extrusion nozzle.

14. The method of claim 13, wherein using the sidewall to direct the laminar flow includes using the laminar flow of gas to generate a non-uniform thickness in the polymer melt extending away from the extrusion nozzle and within the downstream gas conduit, by applying a drag force to the polymer melt within the downstream gas conduit.

15. The method of claim 13, wherein using the sidewall to direct the laminar flow of gas includes mitigating the formation of an open jet along the polymer melt within the downstream gas conduit.

16. The method of claim 12, further including:
using the laminar flow to generate a non-uniform thickness in a polymer melt extruded through the extrusion nozzle, within the downstream gas conduit, and
fracturing the polymer melt along a relatively thin portion of the non-uniform thickness extending beyond the downstream gas conduit.

17. The method of claim 12, wherein coupling the gas nozzle includes controlling the size and aspect ratio of pellets formed from a polymer melt extruded through the extrusion nozzle by providing the downstream gas conduit with a conduit width and a length extending away from the outlet of the extrusion nozzle that is sufficient to maintain laminar flow along the polymer melt extending within the downstream gas conduit and to cause periodic necking along the polymer melt within the downstream gas conduit.

18. The method of claim 12, further including forming discrete droplets from a polymer melt extruded through the extrusion nozzle, by:
necking the polymer melt within the downstream gas conduit by using the laminar flow along the polymer melt to apply drag force to the polymer melt, and
fracturing the polymer melt along necked portions thereof that have been extruded beyond the gas outlet.

19. The method of claim 12, further including extruding the polymer melt through the extrusion nozzle at a rate that is an order of magnitude less than a threshold rate at which the polymer melt would exhibit melt fracture caused by the extrusion.

20. An apparatus comprising:
a polymer extruder configured and arranged to extrude polymer material through an extrusion nozzle; and
a gas nozzle coupled to the polymer extruder and having a gas channel, a downstream gas conduit and a gas outlet, the gas outlet being offset from the extrusion nozzle, the downstream gas conduit extending away from an outlet of the extrusion nozzle to the gas outlet,
wherein the gas nozzle is configured and arranged with the polymer extruder to provide laminar gas flow within the downstream gas conduit along a polymer melt extending from the extrusion nozzle, and wherein the downstream gas conduit and extrusion nozzle are configured and arranged to move relative to one another for positioning an end of the downstream gas conduit in respective positions including at least two of:
a positive setback position in which the end of the downstream gas conduit is offset beyond the outlet of the extrusion nozzle;
a zero setback position in which the end of the downstream gas conduit is laterally aligned with the outlet of the extrusion nozzle; and
a negative setback position in which the end of the downstream gas conduit is aligned with a portion of the extrusion nozzle before the outlet of the extrusion nozzle.

* * * * *